US012340914B2

(12) United States Patent
Maertens et al.

(10) Patent No.: US 12,340,914 B2
(45) Date of Patent: Jun. 24, 2025

(54) METHODS AND SYSTEMS FOR THE PRODUCTION OF ISOTOPES

(71) Applicant: SCK.CEN, Brussels (BE)

(72) Inventors: Dominic Maertens, Westerlo (BE); Thomas Cardinaels, Mol (BE)

(73) Assignee: SCK.CEN, Brussels (BE)

( * ) Notice: Subject to any disclaimer, the term of this patent is extended or adjusted under 35 U.S.C. 154(b) by 341 days.

(21) Appl. No.: 17/765,656

(22) PCT Filed: Aug. 16, 2020

(86) PCT No.: PCT/EP2020/072942
§ 371 (c)(1),
(2) Date: Mar. 31, 2022

(87) PCT Pub. No.: WO2021/063585
PCT Pub. Date: Apr. 8, 2021

(65) Prior Publication Data

US 2022/0415533 A1 Dec. 29, 2022

(30) Foreign Application Priority Data

Oct. 4, 2019 (EP) .................................... 19201581

(51) Int. Cl.
*G21G 1/00* (2006.01)
*G21G 1/10* (2006.01)

(52) U.S. Cl.
CPC ............... *G21G 1/001* (2013.01); *G21G 1/10* (2013.01); *G21G 2001/0089* (2013.01); *G21G 2001/0094* (2013.01)

(58) Field of Classification Search
CPC ........... G21G 1/001; G21G 2001/0089; G21G 2001/0094; G21G 1/10
See application file for complete search history.

(56) References Cited

U.S. PATENT DOCUMENTS 6,208,704 B1 * 3/2001 Lidsky ..................... G21G 1/12 376/156
6,299,666 B1 * 10/2001 Apostolidis ............. G21G 1/10 376/125

(Continued)

FOREIGN PATENT DOCUMENTS

JP 2007508531 A 4/2007
JP 2009527731 A 7/2009

(Continued)

OTHER PUBLICATIONS

Kurysheva, V. V., E. A. Ivanova, and P. E. Prokhorova. "Extractants for Rare Earth Metals." Chimica Techno Acta 3.2 (2016): 97-120. Web.

(Continued)

*Primary Examiner* — Sharon M Davis
(74) *Attorney, Agent, or Firm* — Workman Nydegger

(57) ABSTRACT

A method for producing Pb-212 and Ac-225 isotopes includes irradiating a Ra-226 containing target with charged particles and producing an irradiated target having at least Ac-225 isotope particles. Following irradiation and a cooling period, actinium isotopes are separated from a residual radium-containing fraction using chromatography. Subsequently, after an additional waiting period, lead isotopes are separated from the remaining radium fraction through extraction chromatography. The extraction process employs a resin containing an 18-crown-6 ether or an equivalent in a nitric acid (HNO3) and/or hydrochloric acid (HCl) medium to isolate Pb-212 and Ac-225 isotope particles.

10 Claims, 9 Drawing Sheets

(56) References Cited

U.S. PATENT DOCUMENTS

| | | | |
|---|---|---|---|
| 8,557,120 B2 | 10/2013 | Heres et al. | |
| 9,790,573 B2 | 10/2017 | Moreno Bermudez et al. | |
| 2004/0062695 A1* | 4/2004 | Horwitz | B01J 20/3208 423/21.5 |
| 2006/0198772 A1* | 9/2006 | Abbas | H05H 6/00 423/2 |
| 2007/0076834 A1 | 4/2007 | Moreno Bermudez et al. | |
| 2009/0191122 A1 | 7/2009 | Moreno Bermudez et al. | |
| 2014/0226774 A1 | 8/2014 | Holden et al. | |
| 2015/0170776 A1* | 6/2015 | Torgue | G01N 30/84 376/156 |

FOREIGN PATENT DOCUMENTS

| | | | |
|---|---|---|---|
| JP | 2015523555 | A | 8/2015 |
| RU | 2438200 | C2 | 12/2011 |
| RU | 2575881 | C1 | 2/2016 |
| RU | 2600324 | C1 | 10/2016 |
| WO | 2013174949 | A1 | 11/2013 |

OTHER PUBLICATIONS

Russian Office Action from corresponding RU Application No. 2022109034/07(018888), Dec. 1, 2023.

Russian Search Report from corresponding RU Application No. 2022109034/07(018888), Nov. 27, 2023.

Extended European Search Report from corresponding EP Application No. 19201581.6, Mar. 5, 2020.

International Search Report and Written Opinion from PCT Application No. PCT/EP2020/072942, Oct. 21, 2020.

Apostolidis et al., "Cyclotron production of Ac-225 for targeted alpha therapy", Applied Radiation and Isotopes, as early as Mar. 1, 2005, pp. 383-387, vol. 62, Issue 3.

Maertens et al., "Ra-226/Ac-225 Chemical Separation R&D at SCK•CEN", Journal of Medical Imaging and Radiation Sciences, as early as Mar. 1, 2019, p. S41, vol. 50, Issue 1.

Japanese Office Action from Corresponding Japanese Patent Application No. JP2022-520633, Jul. 16, 2024.

Japanese Office Action from Corresponding Japanese Patent Application No. JP2022-520633, Feb. 25, 2025.

* cited by examiner

METHODS AND SYSTEMS FOR THE PRODUCTION OF ISOTOPES

FIELD OF THE INVENTION

The invention relates to the field of nuclear medical science. More particularly, the present invention relates to methods and systems for the production of isotopes as well as to isotopes thus obtained.

BACKGROUND OF THE INVENTION

It is known that Ac-225 can be used in clinical applications in nuclear medicine, e.g. for the radiation treatment of malignant tumours. One way to produce Ac-225 is by irradiating Ra-226 targets (e.g. $RaCl_2$) with protons. When irradiating Ra-226 (T½: 1600 y) with low-energy (10-25 MeV) protons, Ac-225 (T½: 10 d) is formed in the Ra-226 (p, 2n) Ac-225 nuclear reaction. Around 14 MeV, the threshold energy for the (p, 3n) reaction is reached, leading to production of Ac-224 (T½: 2.9 h), which quickly decays to Ra-224 (T½: 3.66 d).

After irradiation, the Ac-225 must be purified from the Ra and its progeny (e.g. Pb, Po and Bi) before it is to be used.

Nevertheless Pb-212, (T½: 10.64 h), which decays to Bi-212, also is an interesting isotope suited for targeted alpha therapy (TAT). Due to the difference in half-life and shorter decay chain, Pb-212 is not considered a direct competitor for Ac-225, but rather a competitor of At-211 (T½: 7.22 h).

Since the sources for producing medical isotopes are limited, there is a need for efficient methods and systems for producing medical isotopes.

SUMMARY OF THE INVENTION

It is an object of embodiments of the present invention to provide good systems and methods for producing medical isotopes, as well as to provide isotopes thus obtained.

It is an advantage of embodiments of the present invention that relevant production of Pb-212 isotopes is obtained as a by-product of production of Ac-225 isotopes, which is an important isotope for Targeted Alpha Therapy. Pb-212 isotopes are as such also important isotopes for Targeted Alpha Therapy. It is an advantage of embodiments of the present invention that the production of Ac-224 during the production of Ac-225 isotopes is advantageously used for deriving therefrom Pb-212 isotopes, rather than neglecting this fraction and considering this as a negative by-product.

The present invention relates to a method for producing Pb-212 and Ac-225 isotopes, the method comprising

- irradiating a Ra-226 containing target with charged particles and/or photons for producing at least Ac-225 isotopes and Ac-224 isotopes,
- after a cooling time, applying chromatography for separating actinium from the remaining fraction containing radium, and
- after a first further waiting time, applying extraction chromatography using a resin having an 18-crown-6 ether or an equivalent of 18-crown-6 ether, as extractant in $HNO_3$ and/or HCl for separating Pb from the remaining fraction containing radium.

Separating actinium from the remaining fraction containing radium may be performed by applying extraction chromatography.

Alternatively, separating actinium from the remaining fraction containing radium may be performed by applying ion-exchange chromatography using a cation-exchange column. In ion-exchange chromatography, use is made of the difference in charge between Ra(2+) and Ac(3+) to separate these elements.

The Ra-226 containing target comprises any of RaCl2, Ra(NO3)2, Ra(OH)2 or RaCO3. It is an advantage of embodiments of the present invention that different types of Ra-226 containing targets can be used.

Said irradiating with charged particles comprises irradiating with protons and/or irradiating with deuterons. It is an advantage of embodiments of the present invention that both proton irradiation and/or deuteron irradiation can be used.

The method may furthermore comprise, when using deuteron irradiation, aside from producing at least Ac-225 isotopes and Ac-224 isotopes, also producing Ra-225 isotopes.

Irradiating with charged particles may in some embodiments comprise or be irradiating with protons having an entrance beam energy of at least 15 MeV, e.g. between 15 MeV and 30 MeV, e.g. around 22 MeV, e.g. between 18 MeV and 30 MeV, such as for example between 18 Mev and 25 MeV.

Irradiating with charged particles may in some embodiments comprise or be irradiating with deuterons. The irradiating with deuterons may be irradiating with deuterons having an entrance beam energy of at least 20 MeV, e.g. between 20 MeV and 60 MeV, e.g. between 20 MeV and 50 MeV, e.g. around 27 MeV.

It is an advantage of embodiments of the present invention that during the production of Ac-225 isotopes the co-production of Ac-224 isotopes can be maximised, thus providing a maximisation of the possibility for producing Pb-212 isotopes, while maintaining efficient Ac-225 isotope production.

Said irradiating with photons may comprise irradiating with high energy photons such as gamma photons e.g. the photons having an energy of >6.4 MeV. It is an advantage of embodiments of the present invention that the production of Ac-225 is comparatively clean in that only small amounts of other Ac isotopes or even no other Ac isotopes are produced. In embodiments, the photons have an energy of >12 MeV, which is in embodiments the threshold for production of Ra-224/Pb-212.

After a second further waiting time, applied after said first further waiting time, the method may comprise applying a further extraction chromatography process for further separating Pb from the remaining fraction containing radium.

It is an advantage of embodiments of the present invention that due to the further decay of radium, additional production of Pb-212 isotopes can be obtained. This process can be repeated until the quantity of Pb-212 is not longer high enough to cover the processing expenses.

The equivalent of an 18-crown-6 ether may in embodiments be any compound that has an equivalent extraction chromatography functionality towards Pb as 18-crown-6 ether. The equivalent of an 18-crown-6 ether may in embodiments be any compound that comprises a cyclic chain of carbon and oxygen atoms equivalent to that comprised in the 18-crown-6 ether. The equivalent of an 18-crown-6 ether may in embodiments differ from the 18-crown-6 ether in that the equivalent comprises one or more substituents on the cyclic chain, the substituent comprising saturated or unsaturated hydrocarbons possibly comprising heteroatoms, on one or more carbon atoms i.e. replacing one or more hydrogen atoms of the 18-crown-6 ether. In embodiments, the equivalent comprises at least one of a 7π-bond between two adjacent carbon atoms of the cyclic chain. In embodiments, the equivalent of an 18-crown-6 ether comprises benzo-18-crown-6 ether or dibenzo-18-crown-6 ether, or equivalents thereof.

Separating Pb from the remaining fraction containing radium may be based on extraction chromatography using a Sr or Pb resin in $HNO_3$ and/or HCl. The resin may alternatively be any other resin having an 18-crown-6 ether.

It is an advantage of embodiments of the present invention that the production of Pb-212 can be obtained in a relatively easy manner.

Said irradiating with charged particles may comprise irradiating with deuterons and wherein the method further comprises separating Ac-225 from the remaining fraction containing radium based on extraction chromatography using DGA.

Said irradiating a Ra-226 containing target may comprise irradiating using a single irradiation beam stacked targets, the stacked targets comprising a first target for irradiation with charged particles having a first entrance beam energy and a second target for irradiation with charged particles having a second entrance beam energy, the first entrance beam energy being higher than the second beam energy, the first target and the second target being stacked and arranged such that the single irradiation beam first enters the first target and enters the second target after leaving the first target.

It is an advantage of embodiments of the present invention that by using stacked targets, one target can be optimised for production of Ac-225 and one target can be optimised for combined production of Ac-225 and Pb-212.

Applying extraction chromatography for separating Pb from the remaining fraction containing radium may be performed for the first target and not for the second target.

It is an advantage of embodiments of the present invention that the second target will have lower Ac-224 amounts present such that contamination of the Ac-225 isotopes is smaller and the Ac-225 isotopes are available already after a shorter cooling time.

The product of the thickness with the density of the first target is higher than the product of the thickness with the density of the second target.

The present invention also relates to a compound comprising Pb-212 isotopes obtained using a method as described above.

The compound may comprise Pb-210 traces. The concentration, as determined by its activity, may be in the range 0.00001% to 0.01%, e.g. in the range 0.00005% to 0.01%, relative compared to the activity of Pb-212.

The present invention also relates to the use of a compound as described above for targeted alpha therapy.

The present invention also relates to a target assembly for use in the production of Ac-225 and Pb-212 isotopes, the target assembly comprising a stack of a first radium comprising target and a second radium comprising target.

The present invention also relates to a chromatography system for separation of Pb from a radium comprising fraction, the chromatography system being an extraction chromatography system using a resin having an 18-crown-6 ether as extractant in $HNO_3$ and/or HCl. The chromatography system may be using a Sr or Pb resin. The chromatography system may comprise a DGA resin below the resin having an 18-crown-6 ether as extractant. The present invention furthermore relates to a method for separating Pb from a radium comprising fraction.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
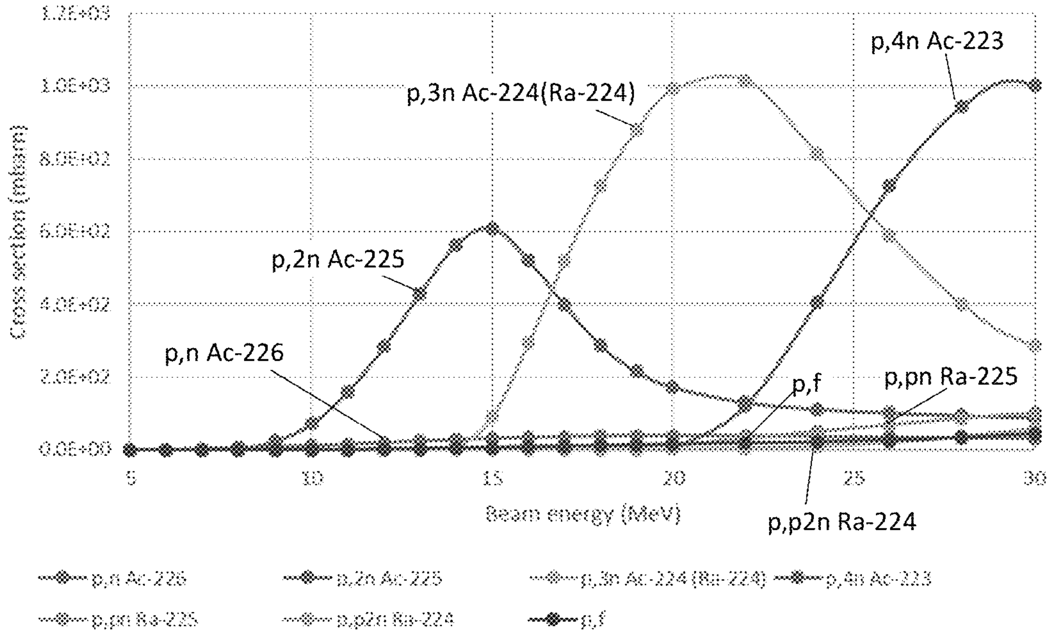
FIG. 1 illustrates the Ra-226 proton reaction cross sections, information as can be used in embodiments according to the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Where in embodiments of the present invention reference is made to a target thickness, this typically may be expressed not merely by the physical thickness as such but by a multiplication of the physical thickness multiplied by the density. The thickness therefore may be expressed in g/cm$^2$.

In the description provided herein, numerous specific details are set forth. However, it is understood that embodiments of the invention may be practiced without these specific details. In other instances, well-known methods, structures and techniques have not been shown in detail in order not to obscure an understanding of this description. A method for producing Pb-212 and Ac-225 isotopes is described. Aside from these isotopes and depending from the charged particles and/or photons used, also the production of Ra-225 isotopes may be envisaged. These isotopes advantageously may be used for medical applications. The method comprises irradiating a Ra-226 containing target with charged particles and/or photons for producing at least Ac-225 isotopes and Ac-224 isotopes, and optionally Ra-225. The Ra-226 containing target may for example comprise any of RaCl2, Ra(NO3)2, Ra(OH)2 or RaCO3.

Irradiating with charged particles can in some embodiments be irradiating with protons. When irradiating Ra-226 (having a half life time T½ of 1600 y) with low-energy (10-25 MeV) protons, Ac-225 (having a half life time T½ of 10 d) is formed in the Ra-226 (p, 2n) Ac-225 nuclear reaction. Around 14 MeV, the threshold energy for another reaction, i.e. the (p, 3n) reaction, is reached, leading to production of Ac-224 (having a half life time T½ of 2.9 h), which quickly decays to Ra-224 (having a half life time T½ of 3.66 d). Above an energy 17 of MeV, the (p, 3n) reaction becomes dominant, while Ac-225 still is produced in significant quantities. FIG. illustrates the Ra-226 proton reaction cross sections. Depending on the type of proton accelerator used, and the maximum proton energy it can deliver, the beam through the target can be shaped towards different optimisations: in one embodiment Ac-224 production can be optimized (Ra-224/Pb-212), e.g. by selecting the energy in the range 25 MeV→15 MeV. In another embodiment Ac-225 production with minimal Ac-224/Ra-224 can be obtained, e.g. by selecting the energy in the range 17 MeV→10 MeV. In yet another embodiment, high production of both Ac-225 and Ac-224/Ra-224 can be obtained, e.g. by selecting the energy in the range 25 MeV→10 MeV.

Figure 2:
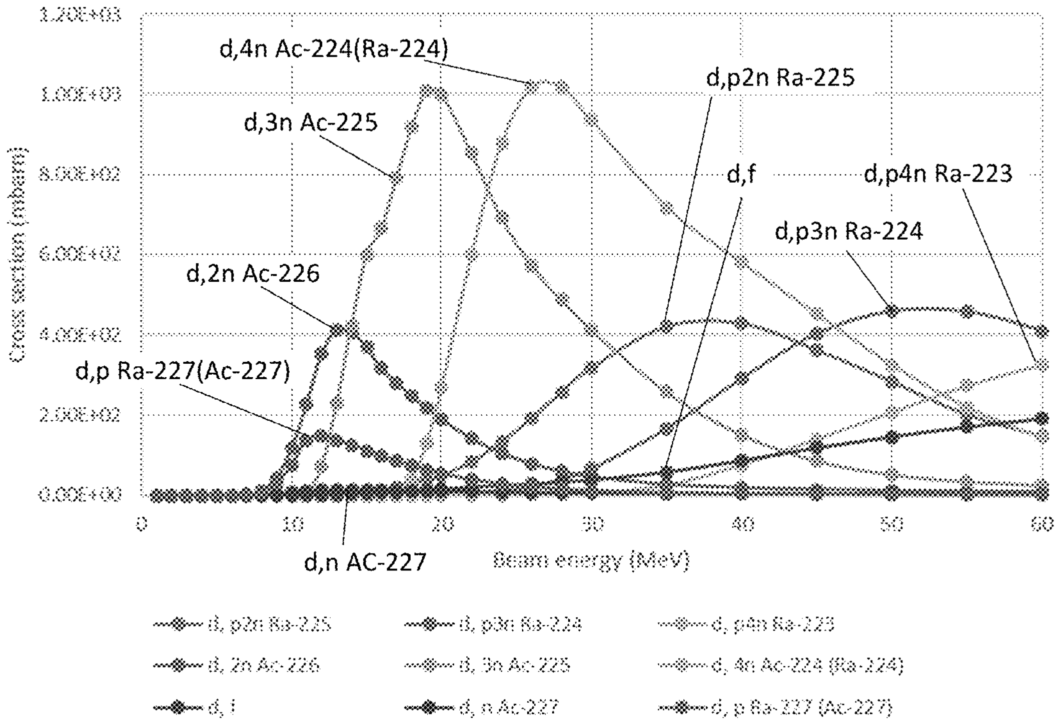
FIG. 2 illustrates the Ra-226 deuteron reaction cross sections, information as can be used in embodiments according to the present invention.

Irradiating with charged particles can in some embodiments be irradiating with deuterons. The irradiation of Ra-226 with deuterons (D) instead of protons (H) can produce even higher quantities of Ac-225 and Pb-212. The Ra-226 deuteron reaction cross sections are shown in FIG. 2. The advantage of using deuterons instead of protons, is that production capacity can be significantly increased due to the higher cross sections, extended range in the targets at higher energies, and considerable co-production of Ra-225 and Ra-224. Depending on the type of deuteron accelerator used, and the maximum deuteron energy it can deliver, the beam through the target can be shaped towards different situations. In one embodiment, Ac-224 (Ra-224/Pb-212) production can be optimised, e.g. by selecting the energy in the range 60 MeV→15 MeV. In another embodiment, Ac-225 production with minimal Ac-227/Ac-224/Ra-224 production can be obtained, e.g. by selecting the energy in the range 20 MeV→10 MeV. In another embodiment, high production of both Ac-225 and Ac-224/Ra-224 can be obtained by selecting the energy in the range 60 MeV→10 MeV.

One aspect of deuteron irradiation is that the production of Ac-226 (T½: 29 h) is more significant than with protons. Ac-226 also has interesting properties to be used for TAT, 83% bèta decays to Th-226 (short-lived alpha emitter (4 α's)), and 17% electron capture decay to Ra-226. For a hypothetical therapeutical Ac-225 dose of 200 μCi, in combination with 10% activity of Ac-226 (20 μCi), a total of 0.25 Bq Ra-226 and 93 Bq Pb-210 is produced from Ac-226 decay. With an Annual Limit of intake (ALI) for Ingestion of 71 kBq for Ra-226 and 29 kBq for Pb-210 (source: nucleonica.com), this co-produced Ra-226 and Pb-210 is not expected to pose problems for clinical applications.

Irradiating with photons may in embodiments comprise irradiating with high energy photons such as gamma photons e.g. having an energy of at least 6 MeV. In certain embodiments, photons having an energy of at least 6 MeV are preferred to convert Ra-226 to Ra-225, which subsequently decays to Ac-225. In embodiments, an advantage of using photons is that it may be the cleanest way to produce Ac-225 as no other Ac isotopes are produced. In embodiments, production of Ra-224 may become significant when photons having an energy above 12 MeV are used.

In embodiments, the photon reaction cross section of the (γ, n) reaction to produce Ra-225 is comparatively low. This issue may be solved by using a high photon flux in case for instance quantities of 1 Ci or higher of Ac-225 are preferred: for instance, a 20-40 MeV electron accelerator may be used in combination with a high-power electron converter target to produce the needed bremsstrahlung photons for this reaction. Advantageously, due to the lack of charge of the photons, the range i.e. penetration depth of photons into the target may be much larger than for the charged particles. Therefore, advantageously, when photons are used, the mass of the target may be up to 10 g Ra-226 or higher. In embodiments, the higher the energy of the electrons hitting the converter, the more photons will be present above the 12 MeV threshold for production of Ra-224/Pb-212. The energy of the electrons hitting the converter, which determines the photon flux above 12 MeV, may be finetuned to increase or decrease the co-produced Ra-224.

Liquid targets may also be used for the Ra-226 (γ, n) Ra-225 production pathway, as the flux of the high energy photons is not highly influenced by the presence of $H_2O$. In embodiments, the characteristics e.g. shape and/or flux of the photon beam may be greatly determined by the electron converter, and this will specify the optimal Ra-226 target.

The method also comprises, after a cooling time, applying chromatography for separating actinium from the remaining fraction containing radium. The chromatography step may be extraction chromatography but alternatively also may be ion-exchange chromatography using a cation-exchange column. In ion-exchange chromatography, use is made of the difference in charge between Ra(2+) and Ac(3+) to separate these elements. The method furthermore also comprises, after a first further waiting time, applying extraction chromatography for separating Pb from the remaining fraction containing radium. In the method, a resin having an 18-crown-6 ether or an equivalent of an 18-crown-6 ether is used, as extractant in $HNO_3$ and/or HCl.

Figure 3:
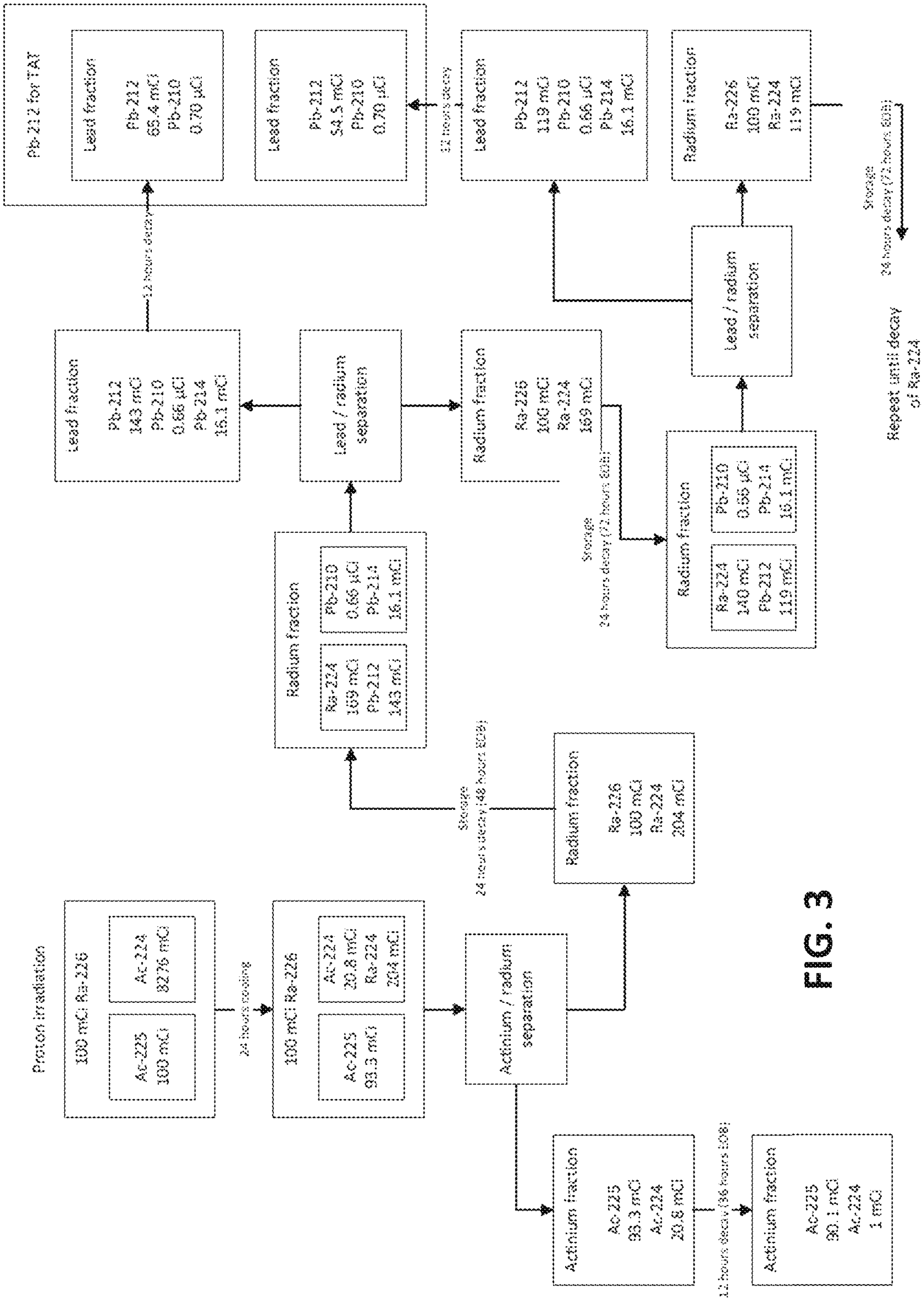
FIG. 3 shows a s flow chart for Pb-212 separation from proton irradiation according to an embodiment of the present invention.

By way of illustration, an exemplary flow chart for separating Pb-212 using proton irradiation is shown in FIG. 3. As a simplified theoretical example, a single 100 mCi Ra-226 target was irradiated with protons at 22 MeV to 10 MeV and produced 100 mCi Ac-225 and 8276 mCi Ac-224 at EOB (end of bombardment), which is an equal amount of Ac-224 and Ac-225 atoms. This starting point seems realistic based on calculated yields for Ac-225 and comparison of the cross-sections data in FIG. 1. In the present example, after 24 hours of cooling time, 93.3 mCi Ac-225 is ready to be separated from the Ra. 20.8 mCi Ac-224 remains present after 24 hours, which is 1/400 of its original activity. The isotopic purity of Ac-225 based on atoms is >99.7%. Still, it would seem reasonable to wait a bit longer to purify Ac-225 until the Ac-225/Ac-224 activity ratio is high enough. At 36 hours, it would be 90.1 mCi Ac-225 and 1 mCi Ac-224 (being an Ac-225/Ac-224 ratio of 90.1). After 24 hours of cooling, 204 mCi of Ra-224 is formed in the target by Ac-224 decay. The target is opened, and the content is separated into an Ac fraction and a Ra fraction by applying extraction chromatography and optionally a precipitation step in advance. The Ac fraction is removed from the hot cell. The Ra fraction containing 204 mCi Ra-224 and 100 mCi Ra-226 is again stored for 24 hours. Again after 24 hours (i.e. 48 hours after EOB), the Ra fraction contains 0.169 Ci Ra-224 and 0.143 Ci Pb-212. The decay of Ra-226 produced 0.66 Ci Pb-210 (T½: 22.2 y), and 16.1 mCi Pb-214 (T½: 26.8 m). Pb is separated from Ra using extraction chromatography. After 12 hours (e.g. dispersion, transport to hospital), the total activity related to Pb-214 is converted to 40.4 nCi Pb-210, while 65.4 mCi Pb-212 remains available including the presence of 0.66 μCi Pb-210. As a reference, the phase 1 study of Pb-212-TCMC-trastuzumab tested doses of up to 21.1 $MBq/m^2$. With an average body surface area of 1.7 $m^2$, 67 patient doses can be prepared from this 65.4 mCi Pb-212. The Ra fraction is again stored for 24 hours. Next (72 hours after EOB), 0.140 Ci Ra-224 remains, and 119 mCi Pb-212 can be separated. Following the same path, this would lead to 56 patient doses. This process can be repeated until the quantity of Pb-212 is no longer high enough to cover the processing expenses.

Figure 4:
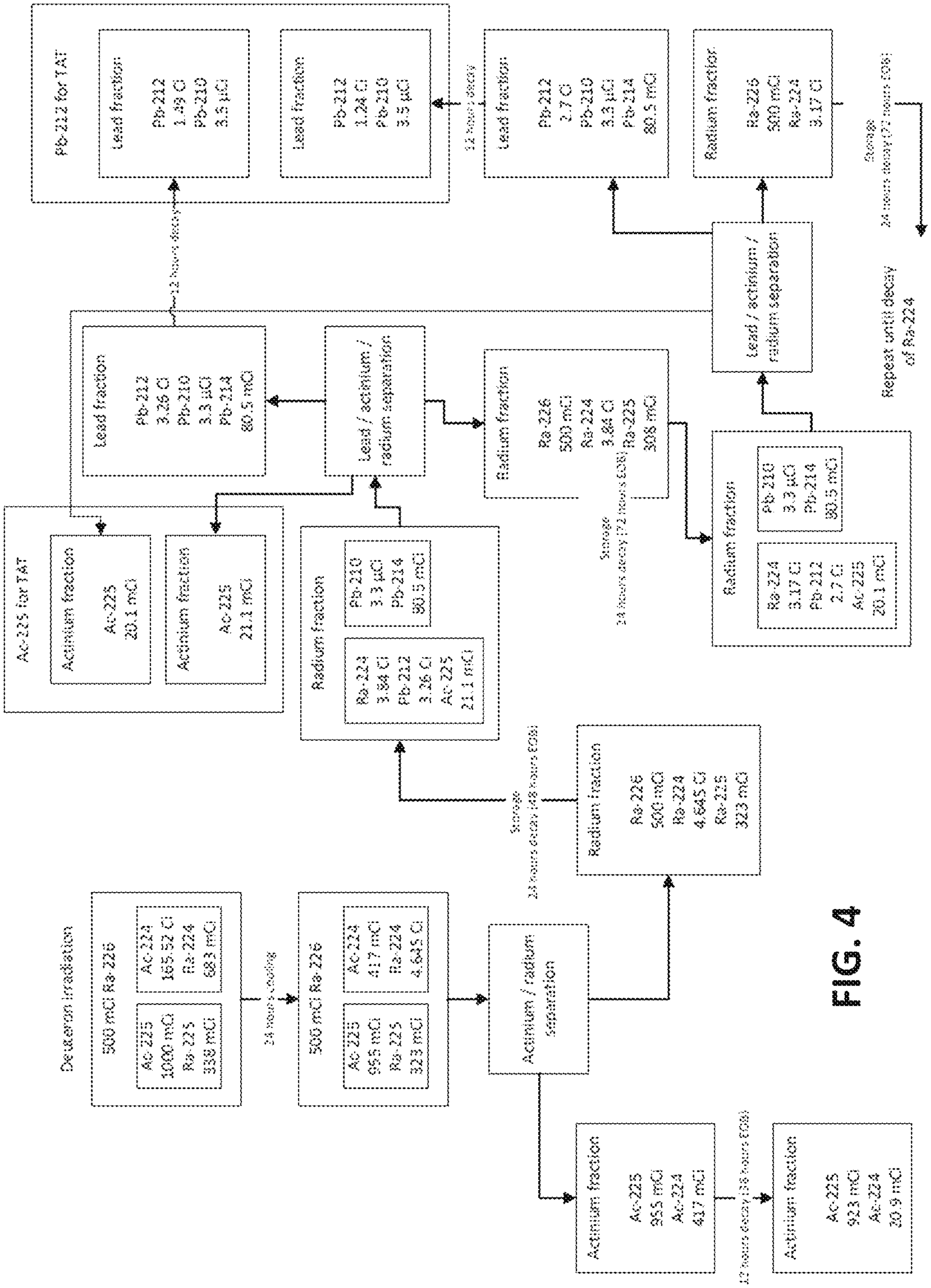
FIG. 4 shows a s flow chart for Pb-212 separation from deuteron irradiation according to an embodiment of the present invention.

For deuteron irradiation, the same methodology can be applied. The first target in the beam can be used to mainly produce Ac-224, while the second target mainly produces Ac-225. The complexity of the separation process is however increased as the cross sections for Ra-224 and Ra-225 production are more prominent compared with proton irradiations, and Ac-225 can be produced from Ra-225. By way of illustration, an exemplary flow chart for separating Pb-212 using deuteron irradiation is shown in FIG. 4. As a simplified theoretical example, a single 500 mCi Ra-226 target was irradiated with deuterons at 50 MeV→10 MeV and produced 1 Ci Ac-225 and 165.52 Ci Ac-224 at EOB (end of bombardment), which is two times more Ac-224 than Ac-225 atoms. 338 mCi Ra-225 is produced, which is half the amount of Ac-225 atoms, and 683 mCi Ra-224, which is half the amount of Ra-225 atoms. After 24 hours of cooling time, 933 mCi Ac-225+22.1 mCi Ac-225 from decay of Ra-225 is ready to be separated from the Ra. 417 mCi Ac-224 remains present after 24 hours, which is 1/400 of its original activity. The isotopic purity of Ac-225 based on atoms is >99.5%. Still, it would seem reasonable to wait a bit longer to purify Ac-225 until also the Ac-225/Ac-224 activity ratio is high enough. At 36 hours, it would be 923 mCi Ac-225 and 20.9 mCi Ac-224 (being an Ac-225/Ac-224 ratio of 44.2).

After 24 hours of cooling, 4.08 Ci of Ra-224 is formed in the target from decay of Ac-224, and 0.565 Ci of Ra-224 still present from the direct production. The target is opened, and the content is separated into an Ac fraction and a Ra fraction by applying extraction chromatography and optionally a precipitation step in advance. The Ac fraction is removed from the hot cell. The Ra fraction containing 4.645 Ci Ra-224, 323 mCi Ra-225 and 500 mCi Ra-226 is again stored for 24 hours. After 24 hours (i.e. 48 hours after EOB), the Ra fraction contains 3.84 Ci Ra-224 and 3.26 Ci Pb-212. The decay of Ra-225 produced 21.1 mCi Ac-225. The decay of Ra-226 produced 3.3 μCi Pb-210 (T½: 22.2 y), and 80.5 mCi Pb-214 (T½: 26.8 m). Pb is separated from Ac and Ra using extraction chromatography. After 12 hours (e.g. dispersion, transport to hospital), the total activity related to Pb-214 is converted to 202 nCi Pb-210, while 1.49 Ci Pb-212 remains available including the presence of 3.3 μCi Pb-210. As a reference, the phase 1 study of Pb-212-TCMC-trastuzumab tested doses of up to 21.1 MBq/$m^2$. With an average body surface area of 1.7 $m^2$, ~1500 patient doses can be prepared from this 1.49 Ci Pb-212. The Ra fraction is again stored for 24 hours. Next (72 hours after EOB), 3.17 Ci Ra-224 remains, and 2.7 Ci Pb-212 can be separated. Following the same path, this would lead to ~1250 patient doses. Also 20.1 mCi Ac-225 is produced from decay of Ra-225. This process can be repeated until the quantity of Pb-212 is no longer high enough to cover the processing expenses. Then it can still be an option to store the Ra fraction for a final Ac-225 recovery, e.g. after two to three weeks EOB. The large advantage of obtaining Ac-225 from the Ra-225 fraction is that contaminants of Ac-224, Ac-226 and Ac-227 will not be present.

Figure 15:
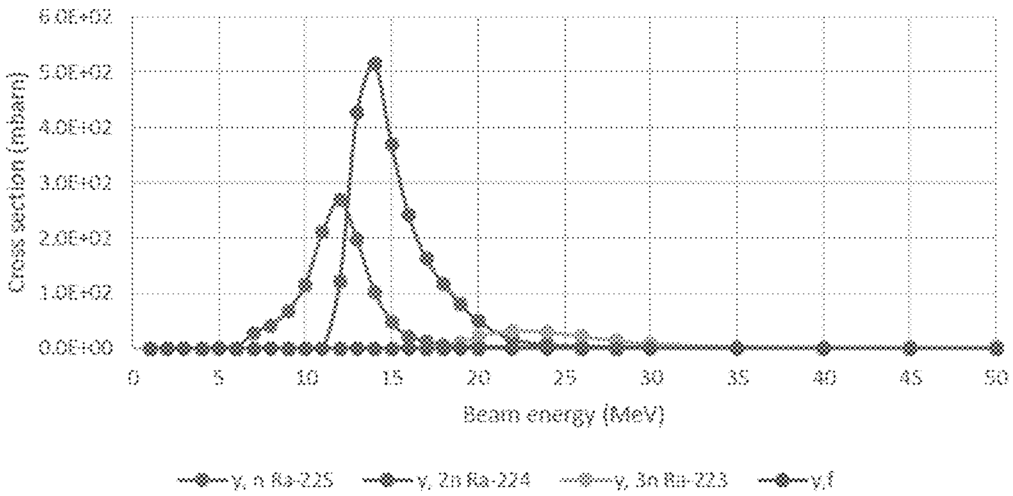
FIG. 15 illustrates the Ra-226 photon reaction cross sections, information as can be used in embodiments according to the present invention.

By way of illustration of embodiments wherein the irradiating is performed with photons, reference is made to FIG. 15, which shows the photon reaction cross-section of Ra-226 for the formation of Ra-225, Ra-224, and Ra-223 as a function of photon energy. For photon energies between 6 MeV and 12 MeV, mainly Ra-225 is produced. A photon energy of 12 MeV is the threshold for the production of Ra-224. A photon energy of 19 MeV is the threshold for the production of Ra-223. In an example, 1 gram of Ra-226 is irradiated by photons for 48 hours. In this example, the assumption is made that for every 10 Ac-225 atoms that are produced, one atom of Ra-224 is co-produced, that is, corresponding to a photon energy between 11 MeV and 12 MeV. After end of irradiation (EOI), one day of cooling is done before the first separation is performed i.e. separating Ra, Ac, and Pb from each other, according to embodiments of the present method. In embodiments, the same separation method can be followed as with the deuteron irradiation targets. Further separations are in this example also performed, each time 48 hours after the previous separation. The activities for the different isotopes before and after subsequent separations as summarized in Table 1: five separations are performed, and for each separation the time in days after EOI is mentioned.

TABLE 1

| | T(d) | Ra-225 (mCi) | Ac-225 (mCi) | Ac-227 (mCi) | Ra-224 (mCi) | Pb-212 (mCi) |
|---|---|---|---|---|---|---|
| EOI | 0 | 5000 | 150 | 0.1 | 2000 | 700 |
| 1st separation | 1 | 4770 | 467 | 0.1 | 1650 | 1557 |
| | | 4770 | 0 | 0 | 1650 | 0 |
| 2nd separation | 3 | 4340 | 589 | 0 | 1130 | 1200 |
| | | 4340 | 0 | 0 | 1130 | 0 |
| 3rd separation | 5 | 3770 | 758 | 0 | 772 | 823 |
| | | 3770 | 0 | 0 | 772 | 0 |
| 4rd separation | 12 | 2720 | 1220 | | 204 | 232 |
| | | 2720 | 0 | | | |
| 5th separation | 21 | 1780 | 1010 | | | |
| | | 1780 | 0 | | | |

Herein, each box of the table corresponding to one of the separations comprises two lines for each isotope comprised in the target: the top line of the two lines corresponds to the isotopes comprised in the target before the corresponding separation, and the bottom line of the two lines corresponds to the isotopes comprised in the target after the corresponding separation i.e. after extraction of the corresponding amounts of Ac and Pb from the target. The first Ac fraction in this example, extracted during the first separation, is likely to be contaminated with small amounts, i.e. 0.1 mCi in this example, of Ac-227. Possibly, the first Ac fraction might only be suited for Ac-225/Bi-213 generators. In the second separation, 589mCi of Ac-225 may be extracted, in the third separation 759mCi, in the fourth separation 1220mCi, and in the fifth 1010mCi. Although in this example, five separations are performed, more may be performed to collect more Ac-225.

The first Pb fraction of his example may also contain elevated amounts of Pb-210 and Pb-214 (not shown in Table 1), compared to the consecutive Pb fractions. However, as shown by this example, in the second separation, 1200mCi of Pb-212 may be extracted, in the third separation 823mCi and in the fourth separation, 232 mCi. Hence, even ignoring the first fraction, Ci amounts of Pb-212 can be obtained in this example.

Figure 5:
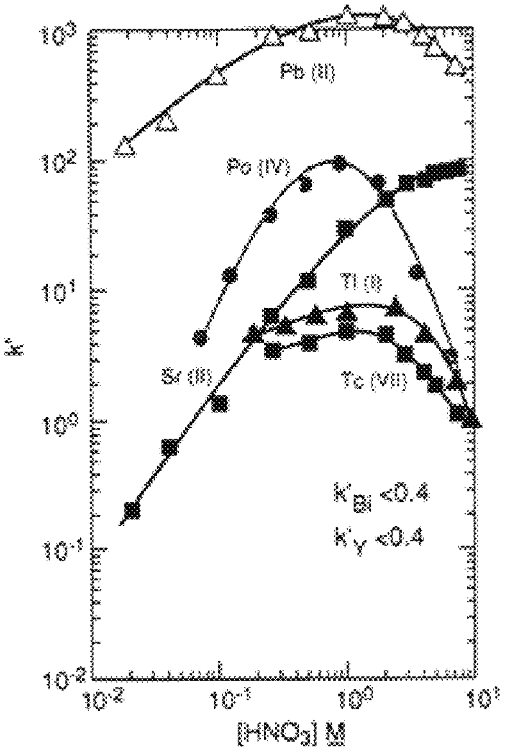
FIG. 5 shows the acid dependency of k' for actinides and other selected ions at 23 to 25° C. for a particle size of loaded Sr resin between 50 and 100 μm, as can be used in embodiments according to the present invention.
Figure 6:
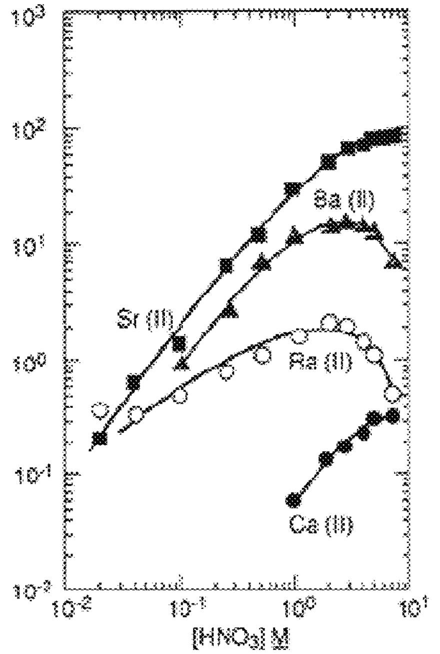
FIG. 6 shows the acid dependency of k' for alkaline earth metal ions at 23 to 25° C. for a particle size of loaded resin between 50 and 100 μm, as can be used in embodiments according to the present invention.
Figure 7:
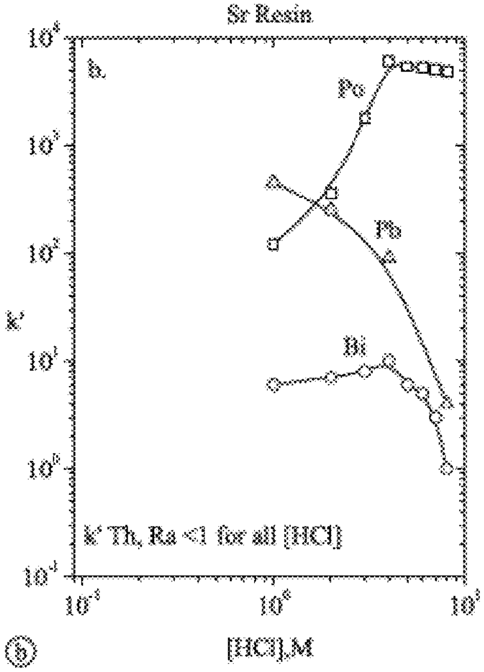
FIG. 7 shows the retention factor k' for Ra(II) and Pb(II) in HCl of loaded Sr resin, as can be used in embodiments according to the present invention.

An example for chemical separation of Pb from Ra also is further discussed. Separation of Pb from Ra is straightforward using e.g. the Sr (or Pb) resin. As Pb has a high affinity for the 18-crown-6 crown ether in the Sr resin in HNO3, the Ra fraction can be loaded in a wide concentration range, from dilute to 2-4 M HNO3 (see FIG. 5), mainly limited by the solubility of Ra(NO3)2. The Sr resin has no affinity for Ra in HNO3 (see FIG. 6). Loading the Sr-resin in HCl matrix is also possible. In one embodiment, the HCl matrix may be 1 to 2M HCl (as can be seen in FIG. 7). No affinity for Ra was found in the whole concentration range. Stripping Pb from the Sr-resin by forming Pb chloride complexes can be efficiently performed using 8 M HCl, and moreover will leave Po-210 on the resin. Alternatively, also 0.1 M ammonium citrate, 0.1 M ammonium oxalate or 0.1 M glycine can be used to recover Pb from the Sr-resin.

An example of chemical separation of Ac from Pb/Ra using a tandem with DGA is also discussed.

Figure 8:
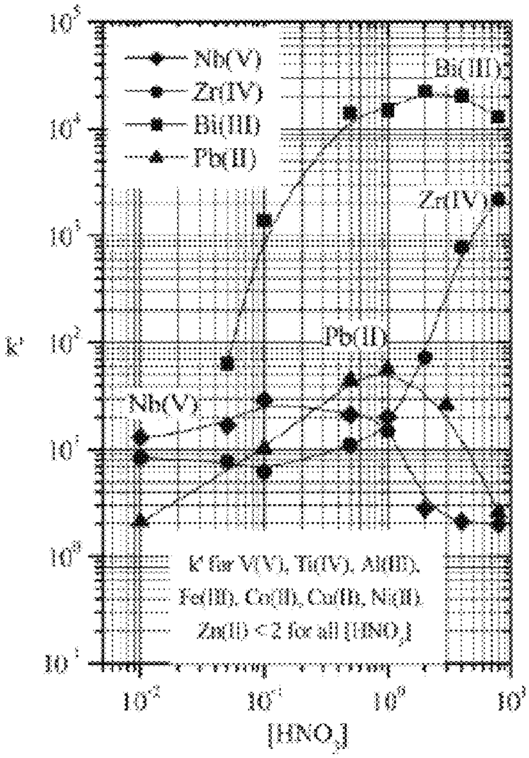
FIG. 8 shows the factor k' for selected transition and post transition elements on TODGA resin (50 and 100 μm) vs HNO3, for a 1 h equilibration time at 22° C., as can be used in embodiments according to the present invention.
Figure 9:
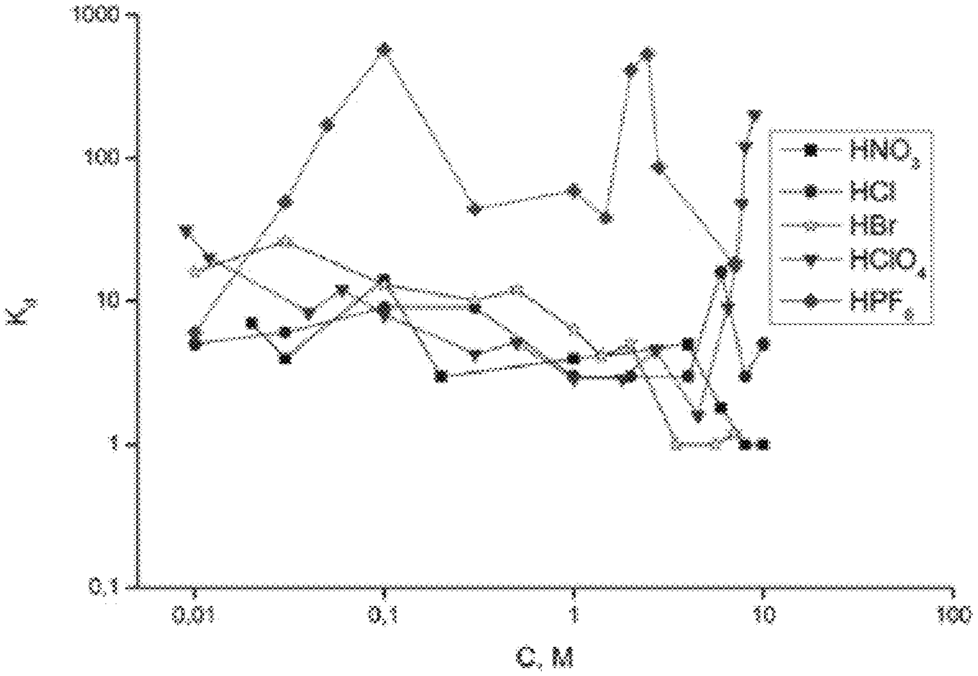
FIG. 9 illustrates the dependency of Kd values of Ac in various Sr-resin/acid systems for acid concentrations, as can be used in embodiments according to the present invention.
Figure 10:
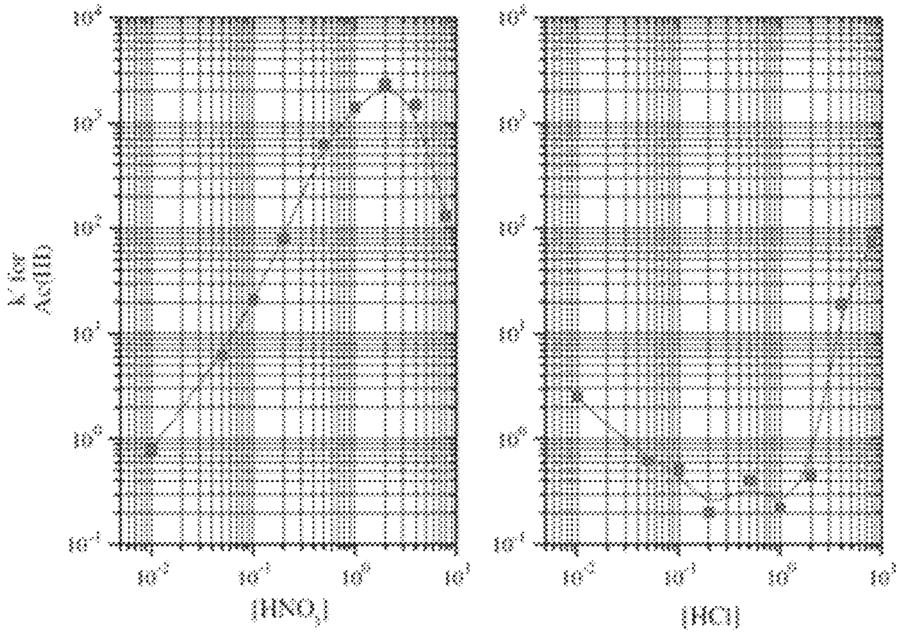
FIG. 10 illustrates the k' factor for AC-225 vs. [HNO3] or HCl on DGA Resin, as can be used in embodiments according to the present invention.

In case of the presence of Ra-225 when irradiating Ra-226 with deuterons, a DGA resin can be placed in tandem with the Sr-resin, and grown-in Ac-225 can be obtained from the DGA. As Pb is somewhat retained by DGA (see FIG. 8), and Ac not by Sr-resin in HNO3 or HCl matrices (see FIG. 9), the DGA should be placed below the Sr. Ac-225 can be eluted using dilute HCl, or HNO3.

Figure 11:
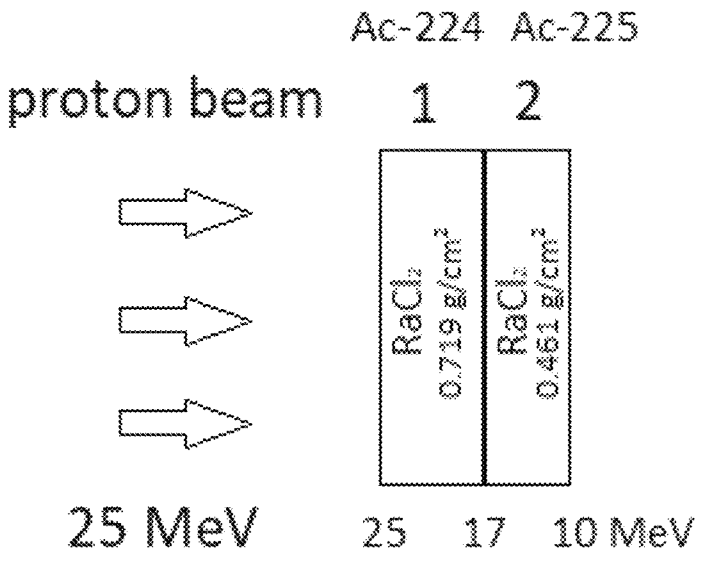
FIG. 11 illustrates an example of a stacked target assembly, according to embodiments of the present invention.

According to embodiments of the present invention, the method as described above can make use of a stacked target assembly. In such a stacked target assembly, two or optionally more targets are stacked so that these can be used simultaneously in one irradiation session for the production of Ac-225 and Pb-212 isotopes. The target assembly comprises a stack of a first Radium comprising target and a second Radium comprising target. The first target in the beam may be adapted for mainly producing Ac-224→Ra-224, while the second target, which is entered after the first target has been passed by the radiation beam, mainly produces Ac-225. As an example, using RaCl2 targets and an entrance beam energy of 25 MeV, a target of (1.51-0.793) 0.717 g/$cm^2$ is placed in the beam as the first target, where the beam exits this target at 17 MeV. Next, a target of (0.793-0.332) 0.461 g/$cm^2$ is stacked directly behind it, where the beam exits at 10 MeV. This way, optimization of isotope production was obtained. An example of a stacked target is shown in FIG. 11.

For deuteron irradiation, a similar example can be given. The first target in the beam can be used to mainly produce Ac-224, while the second target mainly produces Ac-225. The cross sections for Ra-224 and Ra-225 production are more prominent for deuteron irradiations compared with proton irradiations. Based on the data shown in FIG. 2, in an example, a deuteron at 50 MeV on the first target will mainly produce Ac-224 until about 22 MeV, where Ac-225 production becomes dominant. Ra-225 and Ra-224 are mainly produced in the first target. As an example, using RaCl2 targets and an entrance beam energy of 50 MeV, a target of (3.062-0.97) 2.092 g/$cm^2$ is placed in the beam as the first target, where the beam exits this target at 25 MeV. Next, a target of (0.97-0.224) 0.746 g/$cm^2$ is stacked directly behind it, where the beam exits at 10 MeV. This way, optimization of isotope production is a possibility. Ac-225 produced from the first target has higher amount of Ac-227, and might only be suited for production of Ac-225/Bi-213 generators.

TABLE 2

| E (MeV) | Range (g/$cm^2$) |
|---|---|
| 10 → 0 | 0.332 |
| 11 → 0 | 0.388 |
| 12 → 0 | 0.447 |
| 13 → 0 | 0.509 |
| 14 → 0 | 0.575 |
| 15 → 0 | 0.645 |
| 16 → 0 | 0.717 |
| 17 → 0 | 0.793 |
| 18 → 0 | 0.872 |
| 20 → 0 | 1.039 |
| 22.5 → 0 | 1.266 |
| 25 → 0 | 1.51 |

By way of illustration, the present invention not being limited thereto, examples of experimental results will now be discussed below, showing features and advantages of embodiments of the present invention.

In a first example, proton irradiation of $RaCl_2$ is considered. The projected range of the protons was theoretically assessed using modelling software and the results are shown in Table 2.

The thickness of the target material is expressed as g/$cm^2$ (thickness multiplied with density). In case the density of RaCl2 is 2 g/cc, the projected range of 25 MeV protons in RaCl2 is 1.51 g/$cm^2$/2 g/$cm^3$=0.755 cm. As can be seen in FIG. 1, below 10 MeV there is no more significant production of Ac-225, while the protons still release their energy in the target as heat (1.6x10−12 J/proton). Therefore, according to embodiments of the present invention, the target is adjusted to the right energy range so the protons exit the target material at ~10 MeV. For 25 MeV RaCl2 targets, this would be 1.51−0.332=1.178 g/$cm^2$, or 0.589 cm for a 2 g/cc target.

In a second example, deuteron irradiation of RaCl2 is considered. The projected range of the deuterons was theoretically assessed sing modelling software and the results are shown in Table 3.

TABLE 3

| E(MeV) | Range (g/$cm^2$) |
|---|---|
| 10 → 0 | 0.224 |
| 15 → 0 | 0.425 |
| 20 → 0 | 0.675 |
| 25 → 0 | 0.97 |
| 30 → 0 | 1.309 |
| 35 → 0 | 1.689 |
| 40 → 0 | 2.108 |
| 45 → 0 | 2.566 |
| 50 → 0 | 3.062 |
| 55 → 0 | 3.594 |
| 60 → 0 | 4.161 |

Comparing the range data for protons (Table 2) and deuterons (Table 3), it is clear that the range of deuterons at a certain energy is considerably lower than the corresponding range for protons, however the higher cross sections at higher energy (see FIG. 2) result in higher obtainable yields which compensate for the above effect.

In a third example, proton irradiation for alternative targets was studied, including Ra(N03)2, Ra(OH)2 (electroplated) and RaCO3 can be irradiated. The proton range in these compound is shown in table 4.

TABLE 4

| | Range (g/$cm^2$) | | |
|---|---|---|---|
| E (Mev) | Ra(NO3)2 | Ra(OH)2 | RaCO3 |
| 10 → 0 | 0.34 | 0.34 | 0.34 |
| 11 → 0 | 0.39 | 0.40 | 0.40 |
| 12 → 0 | 0.45 | 0.46 | 0.46 |
| 13 → 0 | 0.51 | 0.53 | 0.52 |
| 14 → 0 | 0.58 | 0.59 | 0.59 |
| 15 → 0 | 0.65 | 0.67 | 0.66 |
| 16 → 0 | 0.72 | 0.74 | 0.73 |
| 17 → 0 | 0.80 | 0.82 | 0.81 |
| 18 → 0 | 0.88 | 0.90 | 0.89 |
| 20 → 0 | 1.05 | 1.07 | 1.06 |
| 22.5 → 0 | 1.28 | 1.30 | 1.29 |
| 25 → 0 | 1.52 | 1.55 | 1.54 |

The difference in range between the compounds is rather limited. Also for deuterons, there is no significant difference between the compounds.

In the following example, a full experiment for deriving the isotopes is discussed. A separated and purified source of Th-229 available from historical Th-228 (T½: 1.913 y) production, wherein a small quantity of the original Th-228 is present (~15 kBq), is used to produce Ac-225. In this separation process also Ra-225 is separately collected. As Th-228 decays through Ra-224, the Ra-224 activity is in equilibrium with the Th-228 activity at the point of Th/Ac/Ra separation, and is collected in the same fraction as the Ra-225. This radium fraction is the starting solution for the experiments.

After the Th-229/Ra-225/Ac-225 separation of the ~6.3 MBq Th-229 source, the Ra fraction (~40-45 ml) in 4 M HNO3 matrix was further processed by extraction chromatography using the Triskem vacuum box.

In a first step, a first recovery of Pb-212 and Ac-225 was performed. After about 24 hours, a 1 ml sample from the Ra fraction was taken for HPGe analysis to verify the Ra-225 activity, and to obtain the Ra-225/Ac-225 and Ra-224/Pb-212 equilibrium parameters (Pb S1). A tandem of a 2 ml Sr cartridge and 2 ml DGA cartridge (DGA below Sr) were preconditioned with 10 ml 4 M HNO3. Next 10 ml (5 BV) of the Ra fraction was loaded on the columns. Pb-212 was retained by the Sr resin. Ac-225 was passed through the Sr but was retained by the DGA resin. Ra-225/Ra-224 passed through both resins. The Sr resin was rinsed with 10 ml (5 BV) 1 M HNO3. Pb and Ac were quantitatively retained by the Sr and DGA resin. A 1 M HNO3 was chosen instead of 4 M, as k' for Ac and Pb on respectively DGA and Sr-resin were still sufficiently high, and this lower HNO3 concentration allows evaporating/distillating the fraction back to the original volume (or close thereto) without increasing the acid concentration too much. This can be important when solubility of Ra in HNO3 solution comes into play. In total 20 ml was collected (Pb S2). The DGA was removed from below the Sr resin. Pb-212 was eluted from the Sr resin using 10 ml 8 M HCl (Pb S3). Another 10 ml 8 M HCl was added on the Sr resin to verify tailing (Pb S4). Ac-225 was eluted from the DGA using 10 ml 0.1 M HCl (Pb S5).

In a second step, a 2nd recovery of Pb-212 and Ac-225 was performed. 24 hours after the first Pb/Ac/Ra separation, the process described above was repeated starting directly from the Ra fraction of the 1st part, Pb S2 (10 ml 4 M HNO3+10 ml 1 M HNO3). A tandem of a 2 ml Sr cartridge and 2 ml DGA cartridge (DGA below Sr) were preconditioned with 10 ml 4 M HNO3. Next 20 ml (10 BV) Pb S2 was loaded on the columns. Pb-212 was retained by the Sr resin. Ac-225 was passed through the Sr but retained by the DGA resin. Ra-225/Ra-224 passed through both resins. The Sr resin was rinsed with 10 ml (5 BV) 1 M HNO3. Pb and Ac was quantitatively retained by the Sr and DGA resin. 30 ml in total was collected. The DGA was removed from below the Sr resin. Pb-212 was eluted from the Sr resin using 10 ml 8 M HCl (Pb S6). Another 10 ml 8 M HCl was added on the Sr resin to verify tailing (Pb S7). Ac-225 was eluted from the DGA using 10 ml 0.1 M HCl (Pb S8).

Figure 12:
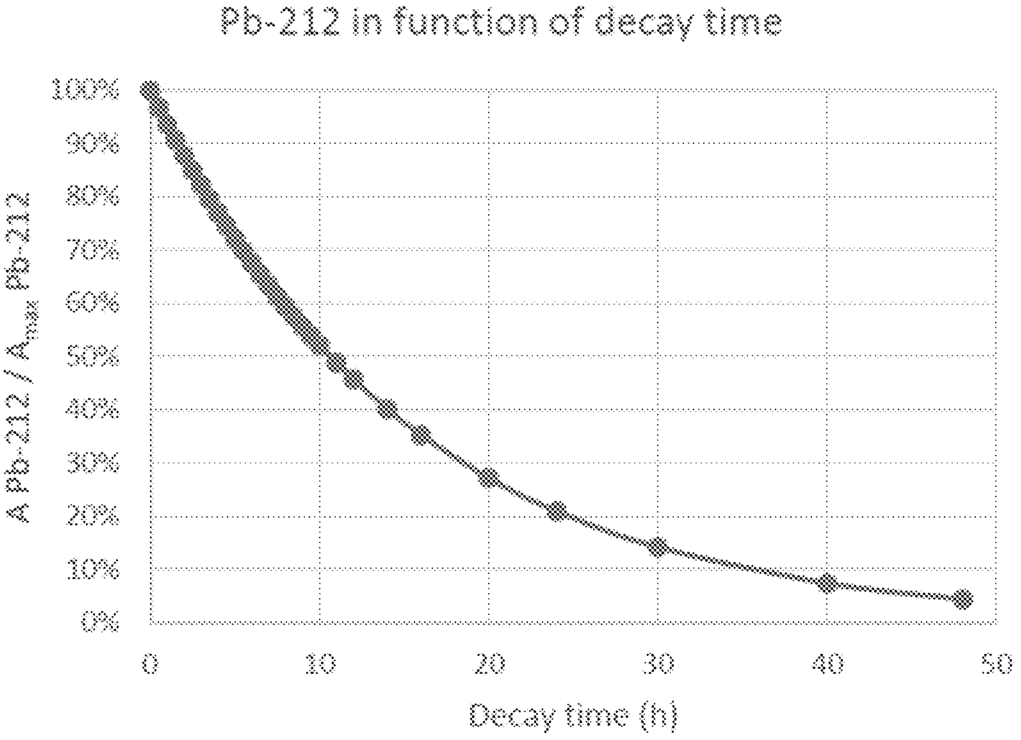
FIG. 12 illustrates PB-212 as function of decay time, providing information as can be used in embodiments of the present invention.

For interpreting the above example, the Pb-212 activity decay in function of time is to be taken into account. When Pb-212 is separated from Ra-224 and Ac-225, no more Pb-212 is being produced from Ra-224 and decay of Pb-212 decreases its activity. For example, after 5 hours of measurement time, the remaining Pb-212 activity is only 72% since the start of the measurement. The decay is shown in FIG. 12 as function of the decay time.

Figure 13:
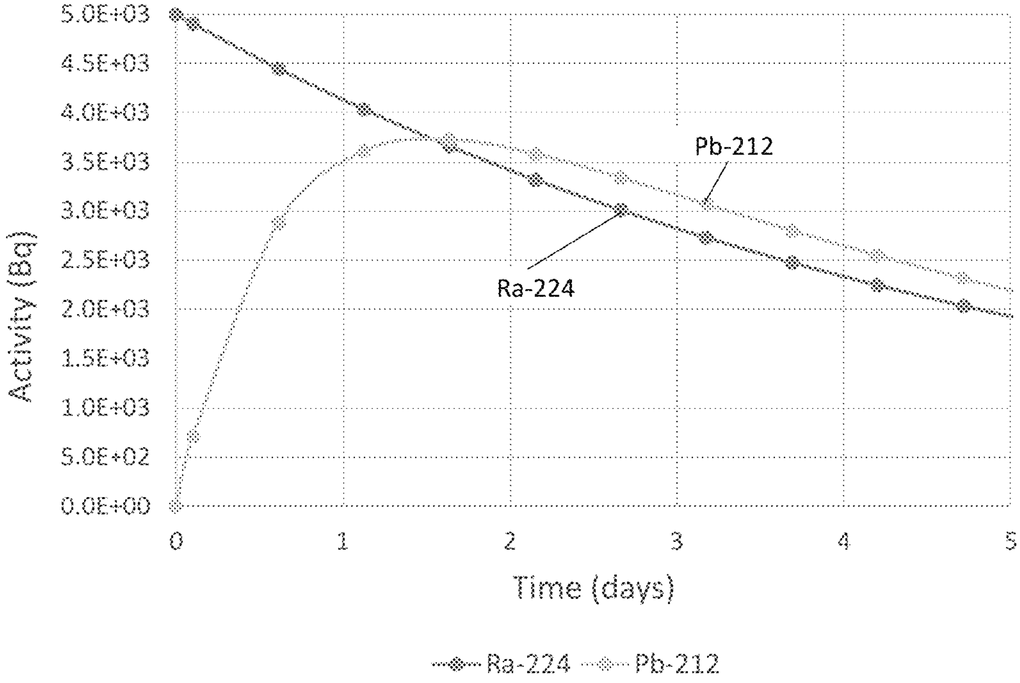
FIG. 13 illustrates the decay of 5 kBq Ra-224, providing information as can be used in embodiments of the present invention.
Figure 14:
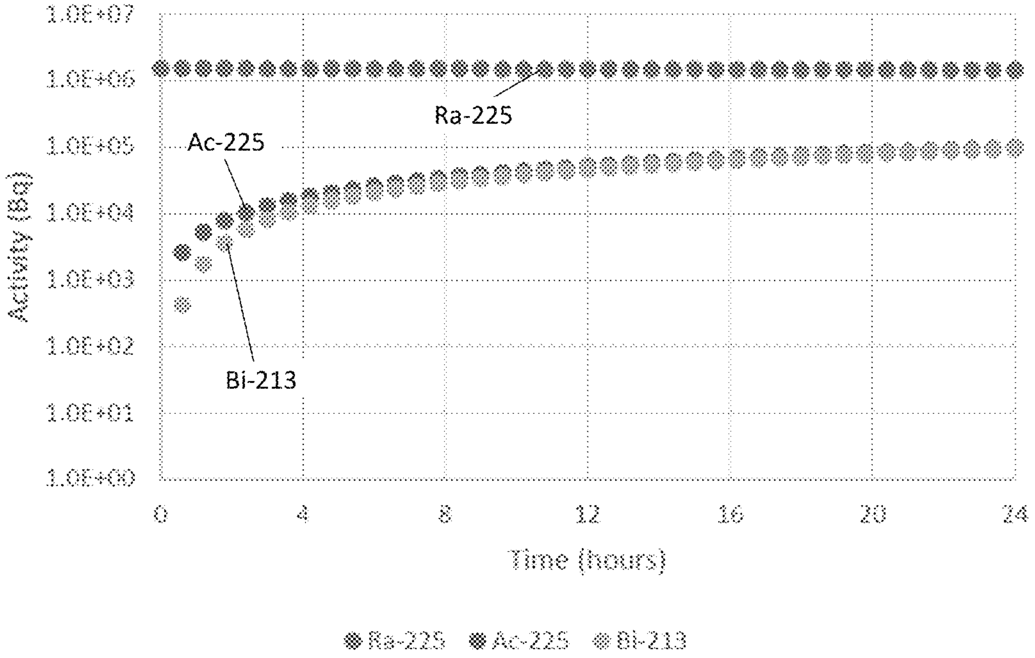
FIG. 14 illustrates the decay of 1.5 MBq Ra-225, providing information as can be used in embodiments of the present invention.

Further Pb-212 and AC-225 growth into the Ra(224+225) fraction is also to be taken into account. Once the Pb/Ac/Ra separation is performed, and the Ra fraction is collected, Pb-212 and Ac-225/Bi-213 start growing in. FIG. 13 and FIG. 14 illustrate the speed of ingrowth. For this reason, trace amounts of Pb-212 and Ac-225 that broke through the Sr and DGA resin cannot be detected, as they would me immediately masked by freshly produced Pb-212 and Ac-225.

The results from gamma spectroscopy without corrections for decay and ingrowth are shown in the below tables.

TABLE 5

| Sample ID | Bq Ra-225 (40 keV) | Bq Ac-225 (440 keV) | Bq Pb-212 (238.6 keV) |
|---|---|---|---|
| Pb S1—spike | 1.5E+05 | 7.7E+03 | 5.2E+02 |
| Pb S2—Ra fraction | 1.5E+06 | 8.5E+03 | 8.1E+02 |
| Pb S3—Pb 1st fraction | 1.1E+03 | 2.6E+01 | 4.1E+03 |
| Pb S4—Pb 2nd fraction | 1.8E+02 | 6.4E+00 | 6.1E+00 |
| Pb S5—Ac fraction | 4.9E+02 | 7.9E+04 | <DL |

TABLE 6

| Sample ID | Bq Ra-225 (40 keV) | Bq Ac-225 (440 keV) | Bq Pb-212 (238.6 keV) |
|---|---|---|---|
| Pb S6—Pb 1st fraction | 1.2E+03 | 2.2E+01 | 2.6E+03 |
| Pb S7—Pb 2nd fraction | 1.4E+02 | 5.1E+00 | 5.3E+00 |
| Pb S8—Ac fraction | 6.8E+02 | 7.8E+04 | <DL |

The 1st Pb fraction (S3 and S6) separated from Ra and Ac collects the Pb-212 in 5 BV 8 M HCl. Rinsing of the feed column and cartridges was performed with only 5 BV 1 M HNO3, therefore traces of Ra-225 are still visible in the Pb fraction. For both S3 and S6 this is ~0.08%, or a DFRa of $>10^3$. Rinsing the Sr resin with an additional 5-10 BV 1-4 M HNO3 can be performed presumably without breakthrough of Pb-212 due to the very high k' Pb in this acid matrix (see FIG. 12), and will further increase the DFRa. Although it is shown that 8 M HCl can be used to recover Pb from the Sr resin, also (complexing) alternatives like citrate and oxalate can be used for this purpose.

The 2nd Pb fractions (S4 and S7) hardly contain residual Pb-212, and traces of Ra. This indicates that recovery of Pb-212 in 5 BV 8 M HCl (S3 and S6) is near-quantitative. The Ra fraction (S2) recovers nearly all Ra. Activity of Ac-225 (Bi-213) and Pb-212 is explained by ingrowth from Ra-225/Fr-221 and Ra-224.

The Ac fractions (S5 and S8) from the DGA collect and recover the Ac as expected, and no Pb is being found in this fraction. As with the Pb fractions, the small amount of BVs to rinse the column and cartridges results into visible traces of Ra in this fraction. For S5 this is 0.04%, for S8 this is 0.05%. From experience it is known that the DGA can be rinsed with 10 BV 1-4 M HNO3 without detectable breakthrough of Ac, these rinsings will further increase DFRa.

There is also no indication that the process performed for part 2 is less effective than part 1. Ac-225 is collected in nearly the same quantity. The decay of Ra-225 after one day is only 4.6%, and decay of Ac-225 after collection and during the measurement is less pronounced. Pb-212 measurement activity is strongly depending on collection time and measurement time. When pursuing Ac-225 production, the co-produced Ac-224/Ra-224/Pb-212 can still be valorised without great additional effort. Co-production of Ac-224 should therefore not necessarily be considered a negative aspect when producing Ac-225. The proton/deuteron energy entering the target is flexible and can be optimized towards maximum Ac-225 production, minimizing Ac-224 production, or maximizing production of both. A stacked target design can increase the processing efficiency.

When further processing the radium fraction after the first Ra/Ac separation, Ac-225 and/or Pb-212 can be separated multiple times. Especially in the case of deuteron irradiation, Ra-224 and Ra-225 will be a valuable source of Pb-212 and NCA Ac-225. Based on a tandem of Sr resin and DGA, this process can be repeated several times to produce the nuclides of interest.

The invention claimed is:

1. A method for producing Pb-212 and Ac-225 isotopes, the method comprising:

irradiating a Ra-226 containing target with charged particles and producing an irradiated target comprising remaining Ra-226 and at least Ac-225 and Ac-224;

after the irradiating, waiting a first period of time during which the Ac-224 decays into Ra-224;

after the first period of time, applying a first extraction chromatography to the irradiated target and producing an actinium fraction containing the Ac-225 and a first radium fraction comprising the remaining Ra-226 and the Ra-224;

after the applying a first extraction chromatography, waiting a second period of time during which the Ra-224 in the first radium fraction decays into Pb-212;

after the second period of time, applying a second extraction chromatography to the first radium fraction and producing a first lead fraction comprising the Pb-212 and a second radium fraction comprising remaining Ra-226 and Ra-224, wherein the second extraction chromatography uses a resin having an 18-crown-6 ether or an equivalent of an 18-crown-6 ether, as extractant in HNO3 and/or HCl.

2. The method according to claim 1, wherein the Ra-226 containing target comprises any of RaC12, Ra (NO3) 2, Ra (OH) 2 or RaCO3.

3. The method according to claim 1, wherein said irradiating with charged particles comprises irradiating with protons or irradiating with deuterons.

4. The method according to claim 3, wherein said irradiating with charged particles comprises:

irradiating with protons having an entrance beam energy of at least 18 MeV, or irradiating with deuterons having an entrance beam energy of at least 20 MeV.

5. The method according to claim 1, further comprising after applying the second extraction chromatography, waiting a third period of time during which the remaining Ra-224 in the second radium fraction decays to additional Pb-212; and applying a third extraction chromatography to the second radium fraction and producing a second lead fraction comprising the additional Pb-212.

6. The method according to claim 5, wherein the third extraction chromatography uses a resin having an 18-crown-6 ether as extractant in HNO3 and/or HCl.

7. The method according to claim 1, wherein said irradiating with charged particles comprises irradiating with deuterons and wherein the first extraction chromatography uses DGA as extractant.

8. The method according to claim 1, wherein the Ra-226 containing target comprises a first target having a first entrance beam energy and a second target having a second entrance beam energy, the first entrance beam energy being higher than the second beam energy, the first target and the second target being stacked and arranged such that the charged particles first enter the first target and then enter the second target after leaving the first target.

9. The method according to claim 8, wherein the second extraction chromatography is applied to the first radium fraction from the first target and not to the first radium fraction from the second target.

10. The method according to claim 8, wherein a product of a thickness with a density of the first target is higher than a product of a thickness with a density of the second target.

* * * * *